Nov. 4, 1947.  W. C. SARGENT  2,430,188
CLAMPING AND BURNING MACHINE FOR STORAGE BATTERY CELL GROUPS
Filed Feb. 18, 1944  7 Sheets-Sheet 1

Inventor
William C. Sargent
By John E. Thacker Jr.
Attorney

Nov. 4, 1947.  W. C. SARGENT  2,430,188
CLAMPING AND BURNING MACHINE FOR STORAGE BATTERY CELL GROUPS
Filed Feb. 18, 1944  7 Sheets-Sheet 2

Inventor
William C. Sargent
By John E. Stryker Jr.
Attorney

Nov. 4, 1947.  W. C. SARGENT  2,430,188
CLAMPING AND BURNING MACHINE FOR STORAGE BATTERY CELL GROUPS
Filed Feb. 18, 1944  7 Sheets-Sheet 3
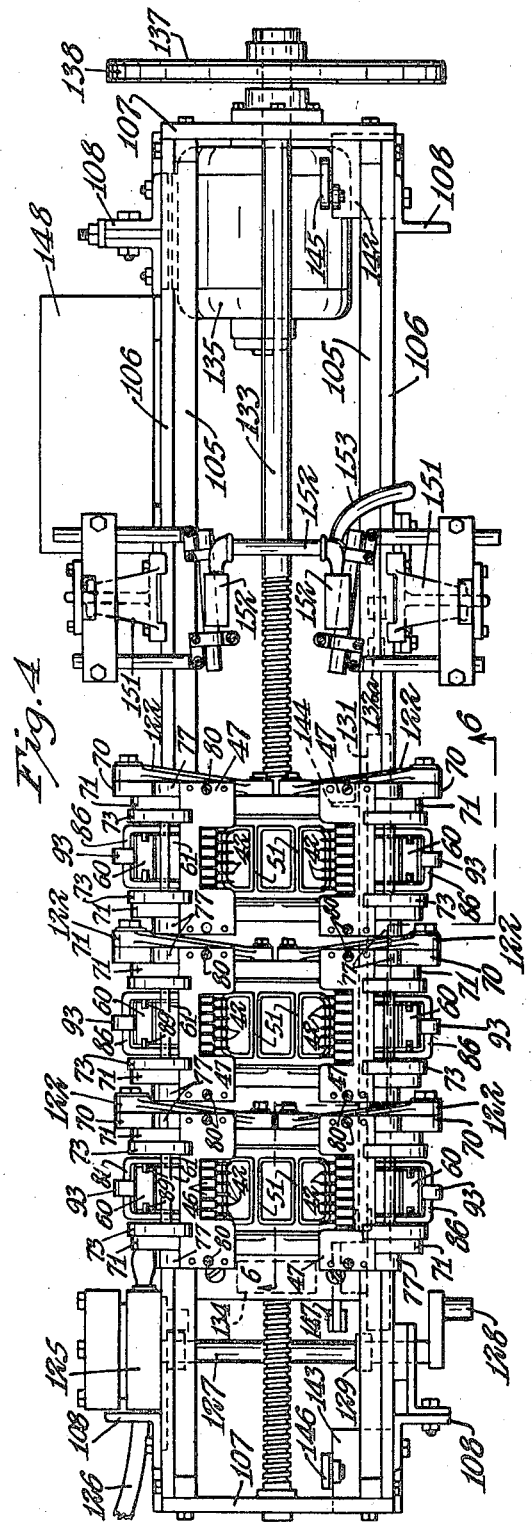
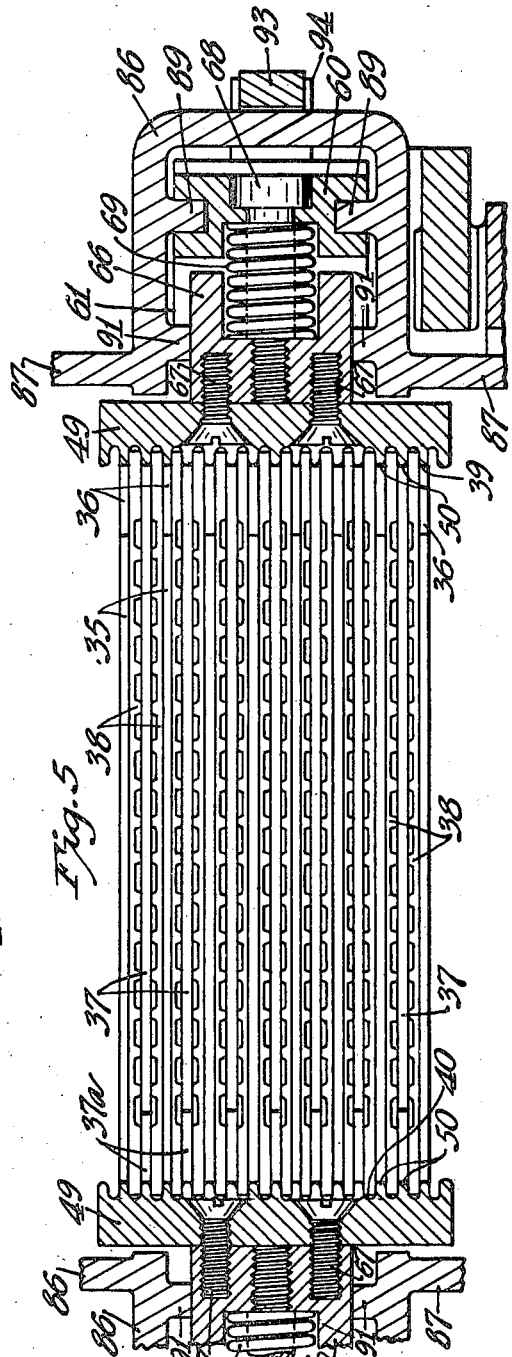
Inventor
William C. Sargent
By John E. Hughes Jr.
Attorney

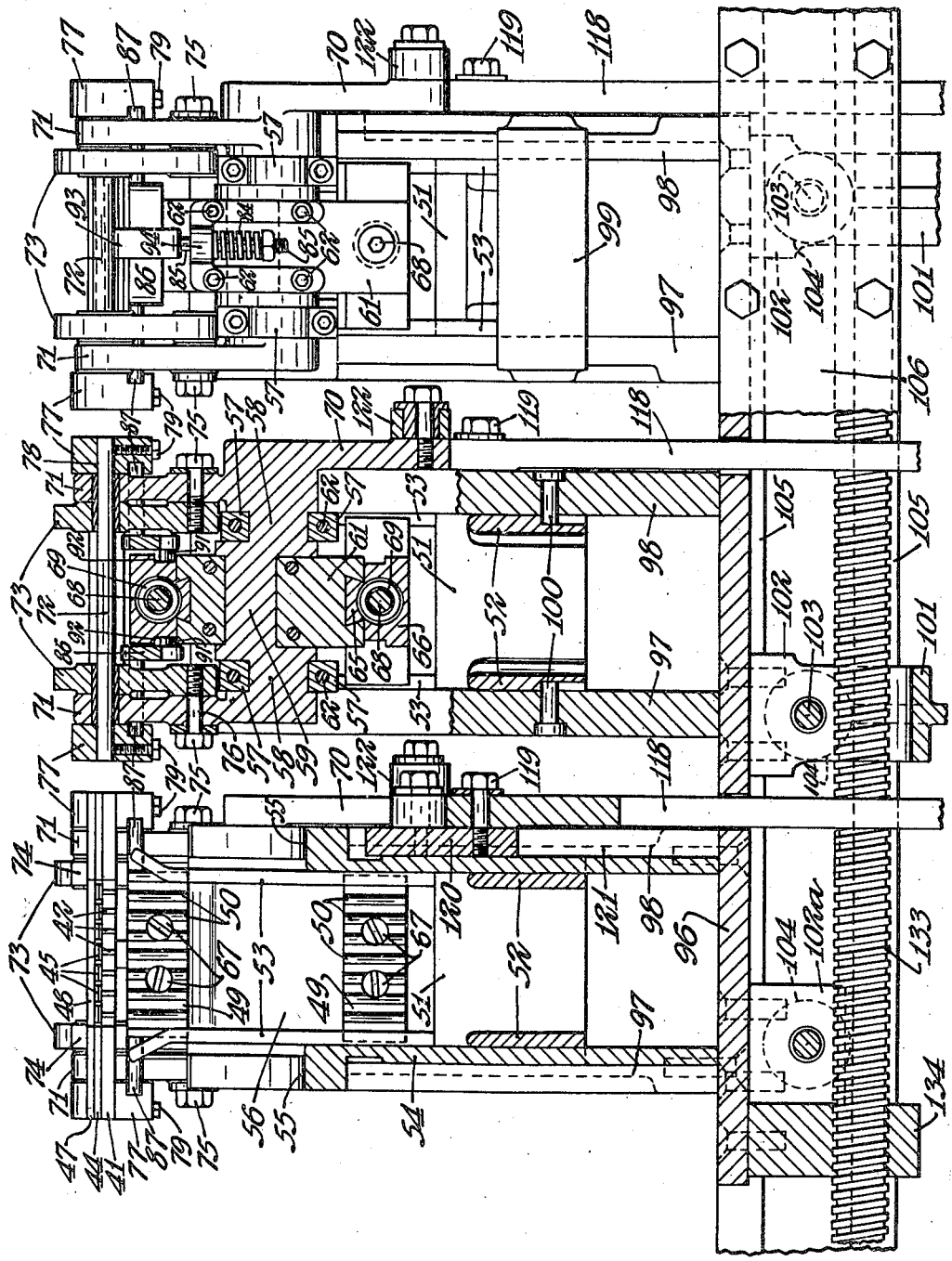

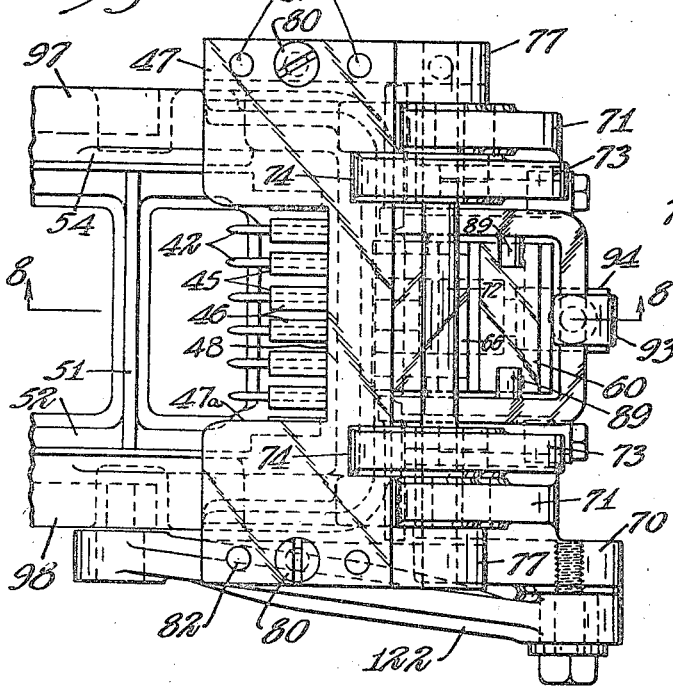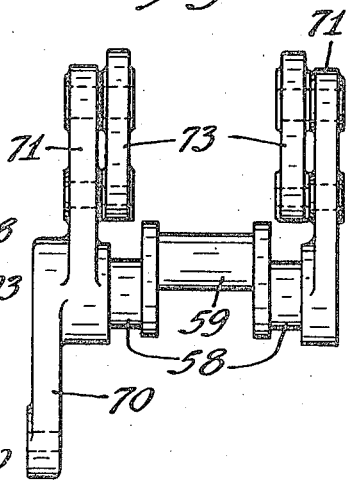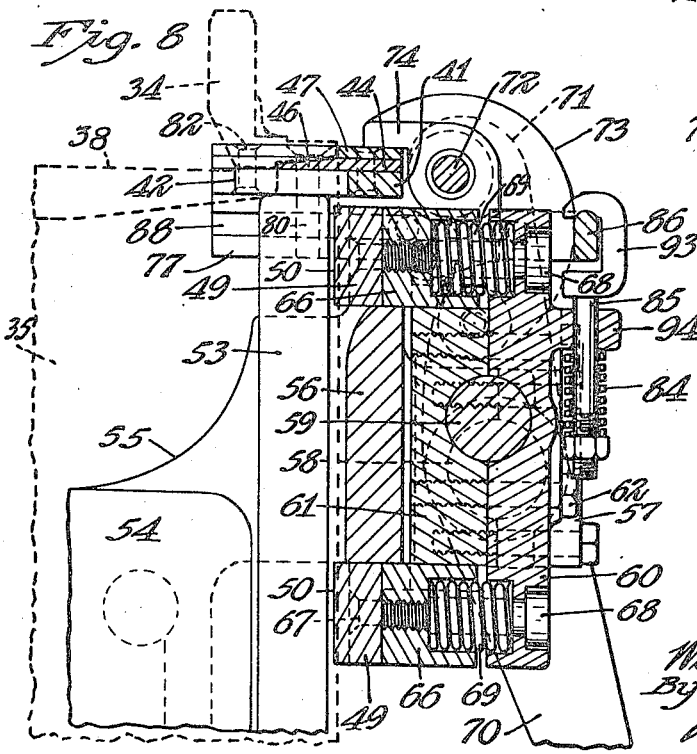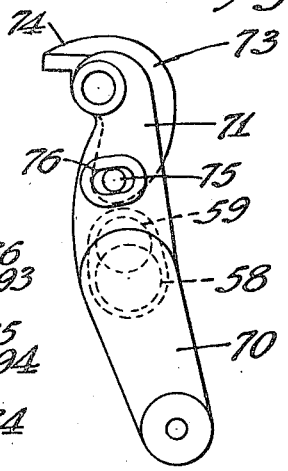

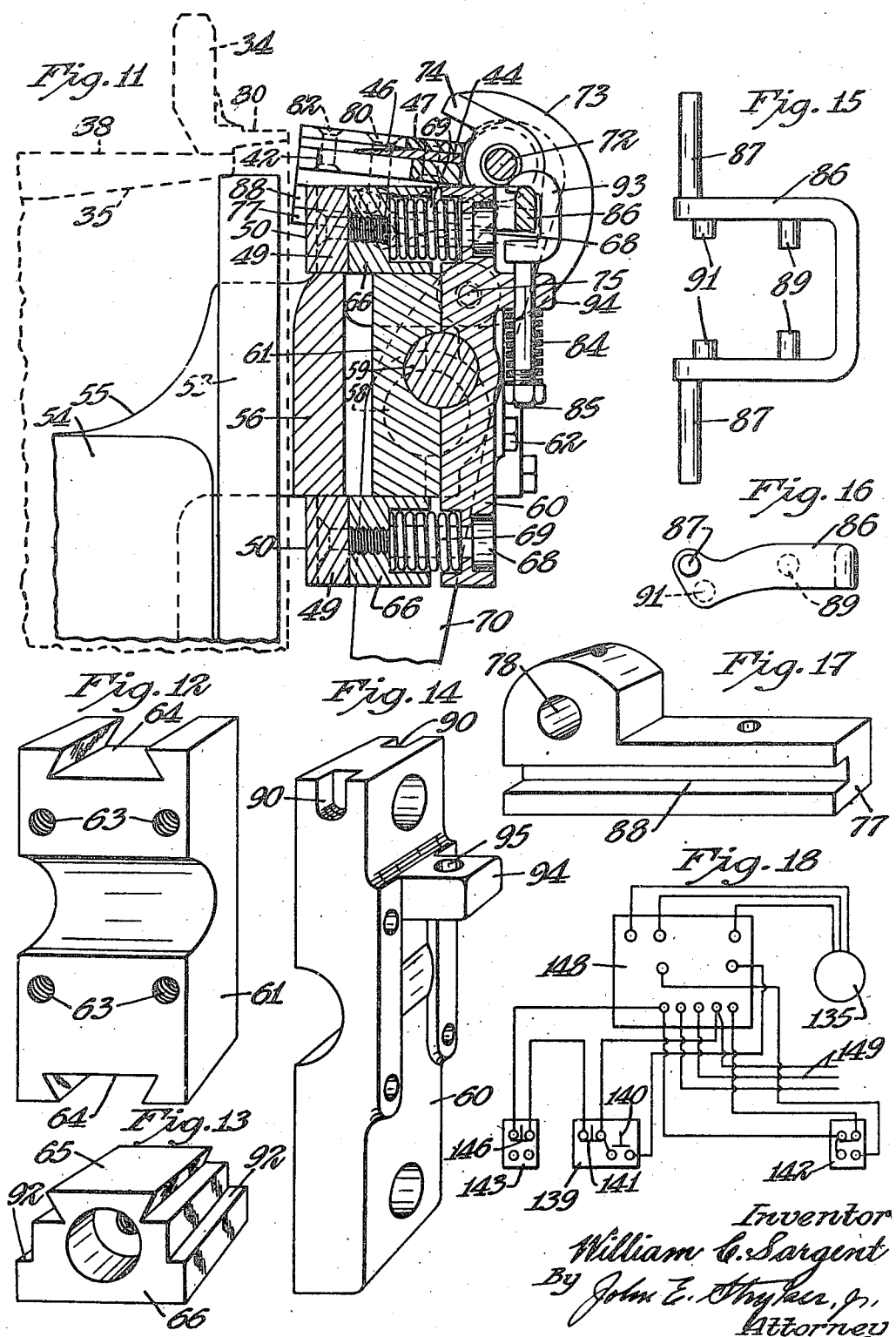

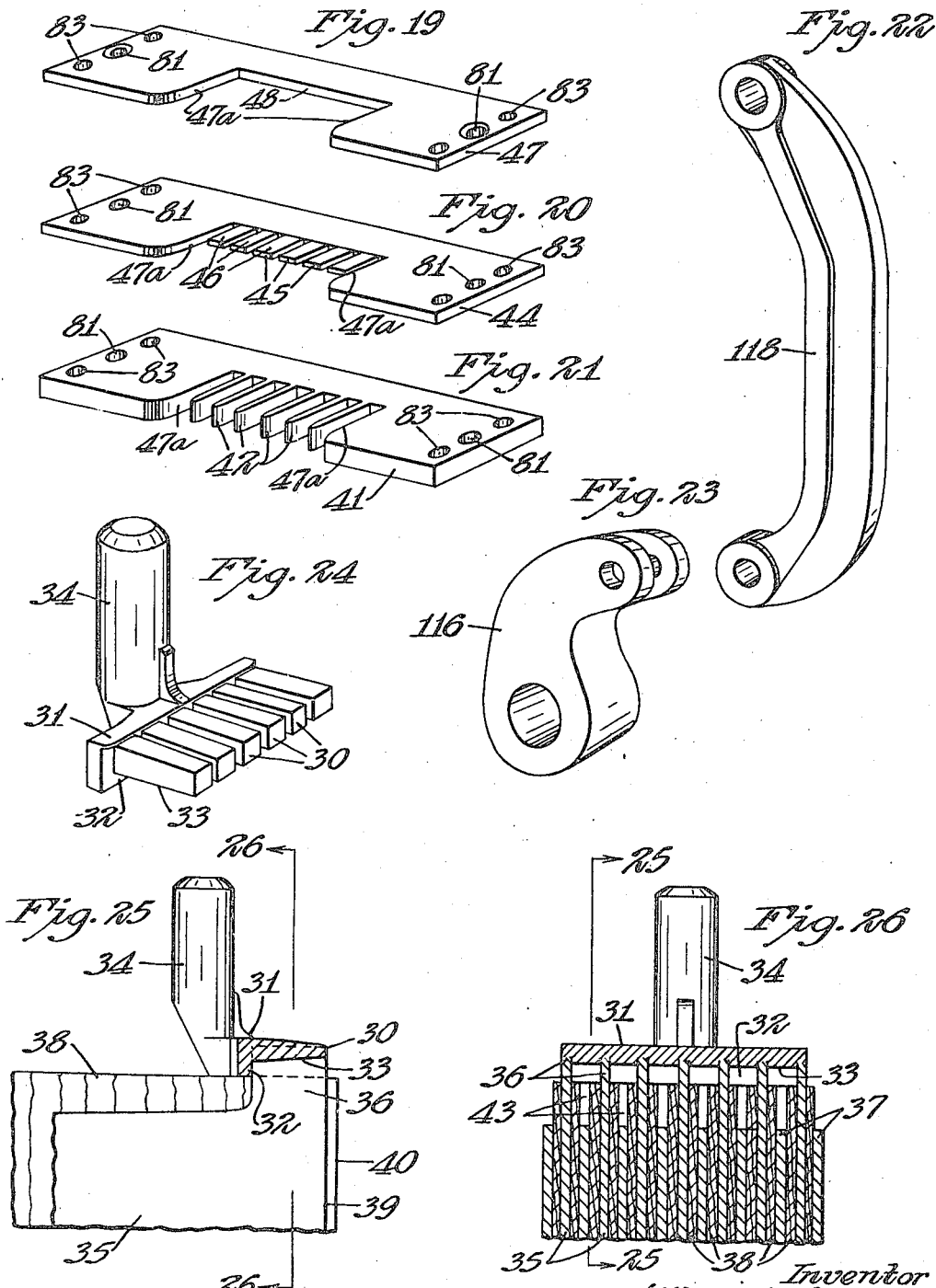

Patented Nov. 4, 1947

2,430,188

UNITED STATES PATENT OFFICE 2,430,188

CLAMPING AND BURNING MACHINE FOR STORAGE BATTERY CELL GROUPS

William C. Sargent, St. Paul, Minn., assignor to National Battery Company, St. Paul, Minn., a corporation of Delaware Application February 18, 1944, Serial No. 522,902

19 Claims. (Cl. 113—59)

It is an object of this invention to provide a novel machine for accurately positioning battery plates and separators in groups and for joining lug straps to the plate lugs in such relationship to the separators that the latter are retained against upward movement in the battery cells by contact with the straps.

A further object is to provide a machine of this class which is particularly, although not exclusively, adapted for use in uniting my novel strap castings to the plate lugs in such positions that the lower surfaces of the straps make contact with the upper edges of the several separators for a battery cell group.

Another object is to provide a machine of this class with novel means for automatically applying lead burning jets to assemblies of plates and straps for predetermined periods of time and in such manner as to insure uniform, rigid joining of all lugs to the straps while eliminating danger of dropping lead between the plates.

My invention also includes a number of novel features of construction whereby the capacity of machines of this class is increased and the manual labor required in the manufacture of storage batteries is reduced.

With these objects in view I provide the preferred machine illustrated and described herein. This machine has a plurality of receptacles adapted to receive loosely assembled groups of positive and negative plates and separators. Associated with the several receptacles are clamping devices some of which engage the vertical edges of the plates and separators to hold them in proper assembled positions and others of which operate along and downward upon the upper margins of the separators to properly position these elements vertically relative to each other and the plates. Movable with the clamping mechanism are members adapted to coact with the plate lugs and preformed strap and post castings for forming the sides and bottom of a mold for molten lead during the subsequent burning operation. To actuate my clamp mechanism I provide fluid pressure means under control of a valve. The operator after closing the clamp mechanism on the groups of plates and separators in the receptacles, manually places a pair of strap and post castings for each group in the mold recesses into which the plate lugs project.

To facilitate the subsequent lead burning operation and to insure uniformity in the work, I mount the receptacles for the battery cell groups and the clamping mechanism therefor on a carriage which is movable to and from gas burners disposed above the carriage to direct the flame against top surfaces of the straps and associated plate lugs. This carriage is electrically driven at a predetermined rate of speed to time the burning operation and insure the application of only sufficient heat to properly unite the straps and plate lugs. The burning operation is preferably performed in two passes of the work through the heating zone, with an intermediate short period for cooling, and the movement of the work relative to the heating jets is automatically timed to insure uniformly good results. To complete a cycle of operation with my machine, after a further short period for cooling, the clamping mechanism control is operated to withdraw the gripping and mold elements of the machine from contact with the finished plate and separator groups and the latter are finally removed manually from the machine receptacles. The groups of elements thus formed are complete, ready for insertion in the battery container cells.

Referring to the accompanying drawings:

Fig. 4 is a top plan view of the machine;

Fig. 5 is a fragmentary horizontal section taken on the line 5—5 of Fig. 3 and on a larger scale;

Fig. 6 is a fragmentary, part side elevation and part vertical section taken approximately on the line 6—6 of Fig. 4;

Fig. 7 is a fragmentary plan view showing one of the group receptacles and clamping mechanism at one side thereof;

Fig. 8 is a fragmentary vertical section taken on the line 8—8 of Fig. 7;

Fig. 9 is a detail, side elevational view showing one of the clamp operating crank and arm assemblies;

Fig. 10 is an end elevational view of the assembly shown in Fig. 9;

Fig. 11 is a section similar to that of Fig. 8, but with the clamping mechanism shown in open position;

Figs. 12, 13 and 14 are isometric views showing certain members of the clamp mechanism;

Figs. 15 and 16 are plan and side elevations respectively of one of the operating members for the top clamp and strap mold assemblies;

Fig. 17 is an isometric view showing one of the arms for supporting the strap mold and top clamp assemblies;

Fig. 18 is an electric wiring diagram for my machine;

Figs. 19, 20 and 21 are isometric views showing a set of the comb and strap mold plates for the machine;

Figs. 22 and 23 are isometric views showing associated clamp operating members;

Fig. 24 is an isometric view showing one of the post and strap castings before the burning operation;

Fig. 25 is a fragmentary vertical section showing a strap casting in united relation to a battery cell group, the section being taken approximately on the line 25—25 of Fig. 26, and Fig. 26 is a fragmentary section taken on the line 26—26 of Fig. 25.

*Strap and post construction*

Figure 1:
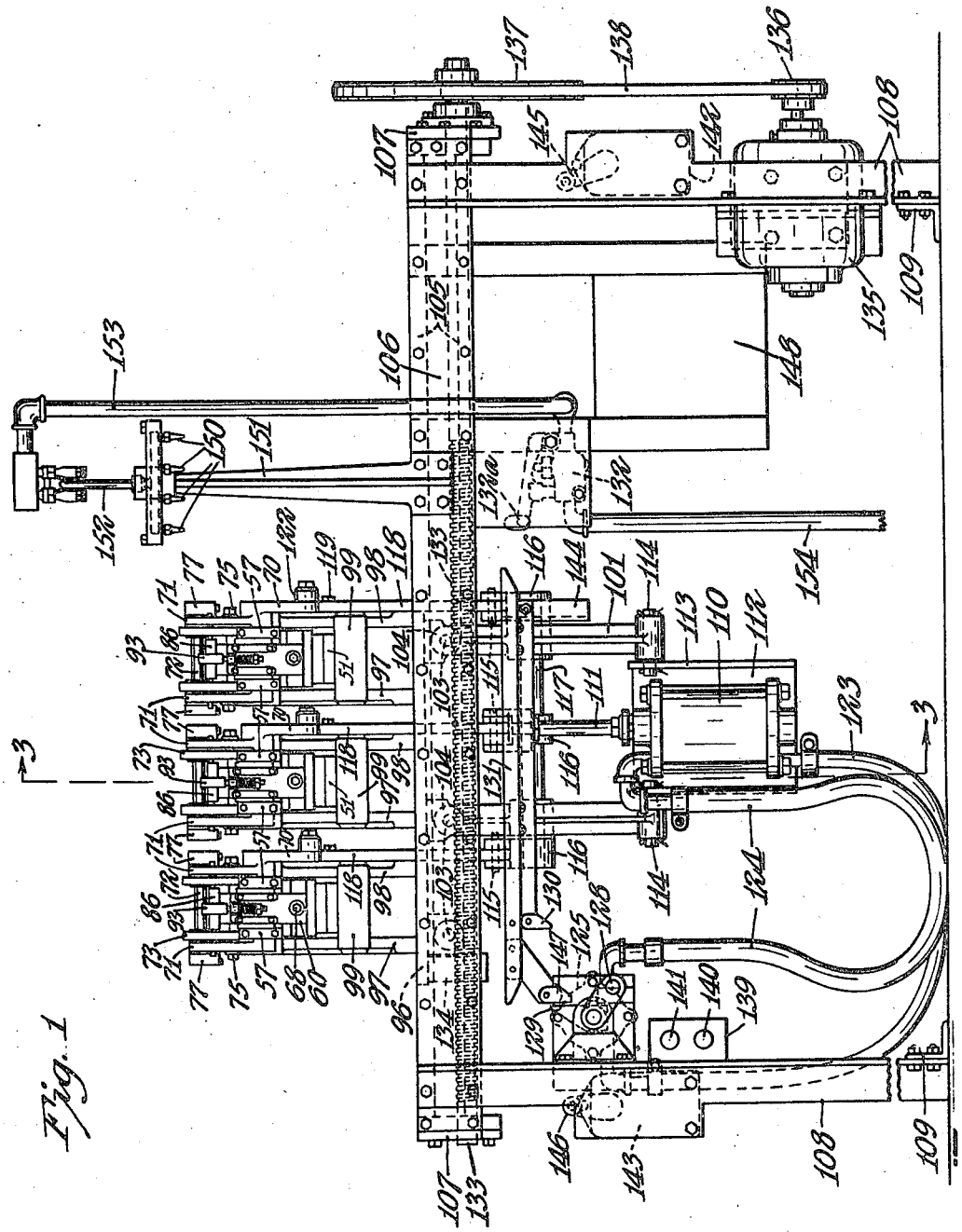
Figure 1 is a side elevation of a machine embodying my invention.

As best shown in Figs. 24, 25 and 26, my improved post and strap casting has a row of fingers 30 formed to fit between the plate lugs of common polarity in an assembled cell group. These fingers 30 are integral with a rigid horizontally extending bar 31 having a flange 32 projecting below the bottom surfaces 33 of the fingers 30. The surfaces 33 are inclined so that the fingers taper toward their free ends. A terminal binding post 34 of the usual or any suitable form projects upward from the bar 31 as a part of the preformed casting which is to be burned to the plate lugs. Referring to Figs. 5, 25 and 26, the elements for a complete cell assembly usually comprise a series of plates or electrodes 35 of the same polarity arranged with lugs 36 projecting upward in a row to be united with one of the post and strap castings, a second series of plates 37 of the opposite polarity formed with a similar row of lugs 37a projecting upward in a row near the opposite end of the group of cell elements and separators 38 interposed between the several plates of opposite polarity. I have shown plates and separators of the common type having substantially vertically disposed edges arranged in a group wherein the vertical edges 40 of the separators project outward slightly from the outer edges 39 of the plates. With my improved strap castings the separators 38 are held down in the cells by contact with the bottom surfaces of the flanges 32 which extend crossways of the group near its ends respectively. This minimizes the danger of short circuits between plates of opposite polarity caused by accumulations of loose active material from the plates along the upper edges of the plate supports in the cell.

*Cell group holding mechanism.*

My improved apparatus for properly adjusting the relative positions of the loosely assembled plate and separator groups and for clamping them in the several groups includes pairs of assemblies, each having jaw members like those shown in Figs. 19, 20 and 21 for engaging the plate lugs and separators. These members comprise a lower, relatively thick comb plate 41 formed with tapered teeth 42 severally adapted to fit in the spaces 43 (Fig. 26) between separators and a second comb plate 44 having relatively wide teeth 45 spaced to intermesh with the lugs 36 above the separators and to form the bottom of a mold recess. The upper surfaces 46 of the teeth 45 slope downward to the free ends of these teeth to conform to the sloping bottom surfaces 33 of the plate fingers 30. Superimposed on the plate 44 is a plate 47 formed with a mold recess 48 adapted to constitute three sides of a strap mold for confining molten metal during the burning operation. The fourth side of the mold recess is formed by the strap bar 31 and flange 32.

In the jaw assemblies best shown in Figs. 7, 8 and 11, the plates 41, 44 and 47 are fixed in registry with each other and with each of the teeth 45 directly above one of the teeth 42 and with the latter projecting inward beyond the free ends of the teeth 45. A similar assembly of comb and mold plates is mounted at the opposite side of the machine and is formed to fit the electrode lugs of the opposite polarity. As hereinafter more fully described, these jaw assemblies are moved from positions free of the group of cell elements, toward said elements with horizontal and downward components of movement so that the tapered teeth 42 first enter the openings 43 between separators to properly space the separators and lugs in the mold recesses and, as the closing motion continues, the teeth 45 enter the spaces above the upper edges of the separators and finally come to rest between the plate lugs to form the bottoms of the mold recesses beneath the strap fingers 30. As shown, each of three receptacles for the cell elements is provided with such top clamping mechanism.

To engage opposite vertical edges of the several electrode plates and separators of each group and to accurately adjust the relative positions of these elements, I provide pairs of jaw plates 49. These are movable substantially horizontally to and from operative position relative to the cell elements and are formed on their faces with vertically extending projections 50, each adapted to fit between adjacent separators 38 for engagement with the vertical edge 39 of the associated plate 37 or 38 (Figs. 5 and 6).

My receptacles for the loosely assembled cell groups have grid-like bottoms formed by parallel cross bars 51 rigidly connected together by longitudinal members 52 (Figs. 6 and 7). A guide 53 extends upward near each corner of the rectangular receptacle and has an outwardly flaring upper end to facilitate the insertion of the groups of elements. A pair of these guides engages the outer face of each of the outer electrode plates of each group. Side walls of the receptacles comprise members 54 having recessed, arcuate upper edges 55 which facilitate manual insertion and removal of the cell groups by permitting the hand of the operator to grasp the outer faces of the outer plates. End walls 56 of the receptacles are cast integrally with the side walls 55 and are formed to flare outward at their inner upper portions to further facilitate the insertion of the loosely assembled groups of cell elements.

*Clamp jaw operating mechanism*

Projecting outward from each of the end walls 56 are journal bearings 57 for a horizontally extending crank shaft 58 (Figs. 2, 6, 9 and 10). This crank shaft and the associated mechanism for operating the clamp jaw members is duplicated at each end of each of the receptacles for battery elements. A crank 59 formed on the shaft 58 has a bearing formed one-half in an outer casting 60 and the other half in an inner casting 61, and these castings have plane abutting faces held together by pairs of screws 62 extending through holes in the casting 60 and threaded in tapped holes 63 formed in the casting 61. As best shown in Figs. 6, 12 and 13, guideways 64 are formed in the upper and lower ends of the block 61 to slidably receive dovetailed projections 65 formed on blocks 66. Each of the blocks 66 is adapted to support one of the clamp jaw plates 49. Screws 67 (Figs. 5 and 6) connect each of the plates 49 to one of the blocks 66 and a bolt 68 connects each of the blocks 66 to a casting 60. Confined on each bolt 68 in recesses formed in the block 66 and casting 60 is a pressure relief spring 69. By this mechanism limited movement of the several plates 49 and blocks 66 is permitted relative to the castings 60 in the event that an unusual obstruction is encountered during the closing movement of the clamping jaws.

Depending from one end of the shaft 58 and rigidly secured thereto is an arm 70 adapted to be oscillated through an angle of approximately 20 degrees for closing and opening the clamp jaws. To operate the upper group of clamp jaw members comprising the plates 41, 44 and 47, I provide a pair of arms 71 which project upward from and are rigidly secured to opposite ends of the crank shaft 58. The upper ends of these arms 71 are perforated to receive a horizontally extending shaft 72. Pivotally supported on this shaft is a pair of members 73 formed with inwardly projecting ends 74 adapted to press down on the mold plate 47 during the closing stroke of the jaws. The members 73 extend along the arms 71 respectively and are severally connected thereto by clamp screws 75 which pass through elongated openings 76 permitting adjustment of the clamping positions of the ends 74.

Supporting each set of comb plates 41 and 44 and mold plates 47 is a pair of arms 77 having bearings 78 fitting the ends respectively of the shaft 72 carried by the upper ends of the arms 71. As best shown in Fig. 6, the arms 77 are fastened to the end portions of the shaft 72 by set screws 79. The arms 77 have flat top surfaces to receive the set of plates 41, 44 and 47 and these plates are held in place on the arms 77 by screws 80 (Fig. 7) extending through openings 81 in the several plates (Figs. 19, 20 and 21). These plates are also fastened together by rivets 82 extending in holes 83. The inner ends of the arms 77 are resiliently pressed upward by a spring 84 acting through a bolt 85, U-shaped member 86 and laterally projecting studs 87. The outer ends of these studs slidably engage the arms 77 respectively in grooves 88 formed therein (Figs. 7, 8 and 11). As best shown in Figs. 15 and 16, the U-shaped member 86 has a pair of rigid studs 89 projecting inward to fit in bearing recesses 90 (Fig. 14) extending down from the upper end of the casting 60. Another pair of studs 91 project from the U-shaped member 86 to engage the upper block 66 beneath shoulders 92 formed thereon (Figs. 6 and 13). These studs 91 coact with the shoulders 92 to limit oscillating movement of the arms 77 in an upward direction when in the open position shown in Fig. 11. They permit downward movement to the substantially horizontal position of the arms 77 and comb plates when the clamping jaws are closed. The upper end of the bolt 83 is provided with a hook shaped member 93 for transmitting the downward pull of the spring 84 to the U-shaped member 86 and a lug 94 on the casting 60 affords a bearing for the upper end of the spring 84, a hole 95 being formed in the lug to slidably receive the bolt 85.

*Operation of clamping mechanism*

In operation the crank shaft 58 is oscillated through a predetermined angle of approximately 20 degrees to move the several clamp jaw members from the closed position shown in Figs. 1 to 8 inclusive to the open position shown in Fig. 11. When the parts are in open position it will be evident that the horizontally movable jaw plates 49 are spaced outward from the electrode and separator elements and the top jaw members comprising the assembly of plates 41, 44 and 47 are also spaced outward from the plate lugs and elevated from the level of the upper edges of the separators 38 by the springs 84 acting through the connections, including the U-shaped members 86. During the closing movement, from this open position, the comb plates 41 and 44 and mold plates 47 supported on the arms 77 are moved inward together with the upper ends of the arms 71 carrying the members 73 so that the ends 74 of members 73 swing downward and inward. This causes the tapered fingers 42 to enter the several openings 43 (Fig. 26) between adjacent separators followed by the fingers 45 which enter between the plate lugs above the separators, finally to come to rest with the plate lugs fitting between the teeth 45 and with the outer electrode plates confined between the opposing faces 47a of the mold plates 41. The final downward component of this movement is accurately determined by the ends 74 of the members 73 in contact with the upper faces of the plate 47.

Simultaneously with the closing of the upper jaw members, the plates 49 are moved substantially horizontally toward the vertical edges of the battery elements, this movement being transmitted from the cranks 59 through the castings 60 and 61, pressure relief springs 69 and blocks 66. This accurately centers the battery elements in the several receptacles and properly spaces the vertical edges 40 of the separators 38 from the vertical edges 39 of the electrode plates in each group. The jaws are retained in closed position during the subsequent placing of the post and strap castings and while they are burned to the electrode lugs. It will be evident that the pressure relief springs 69 act during the closing movement to relieve excess pressure in cases where the plates or separators are so wide or deformed as to prevent the jaws from closing fully and to thereby prevent breakage of the work or machine parts.

As the next operation, the operator places pairs of the post and strap castings such as those hereinbefore described in engagement with the upper ends of the plate lugs 37 and 37a, with the flanges 32 of the bars 31 resting on the upper edges of the separators 38, as indicated in Fig. 25. When all of the post and strap castings have been thus placed in engagement with the appropriate rows of lugs, the machine is operated as hereinafter described to unite the upper ends of the plate lugs to the respective strap castings, as indicated in Fig. 26.

Finally the several groups of jaw members are withdrawn from engagement with the battery cell elements and the product is removed from the machine. During the opening movement, the plates 49 are moved substantially horizontally away from the electrode plates by the outward rocking movement of the cranks 59 while the teeth 42 and 45 of the upper groups of jaw plates are withdrawn horizontally from engagement with the electrode lugs and connecting straps. This horizontal movement is accompanied by pivotal movement of the arms 77 on the shafts 72 while the springs 84 hold the teeth 45 against the bottom surfaces of the lug straps, these springs being compressed during the outward stroke.

After clearing the lug straps the plates 41, 44 and 47 are sprung upward to the open position indicated in Fig. 11 by the springs 84.

Carriage and frame construction

Figure 3:
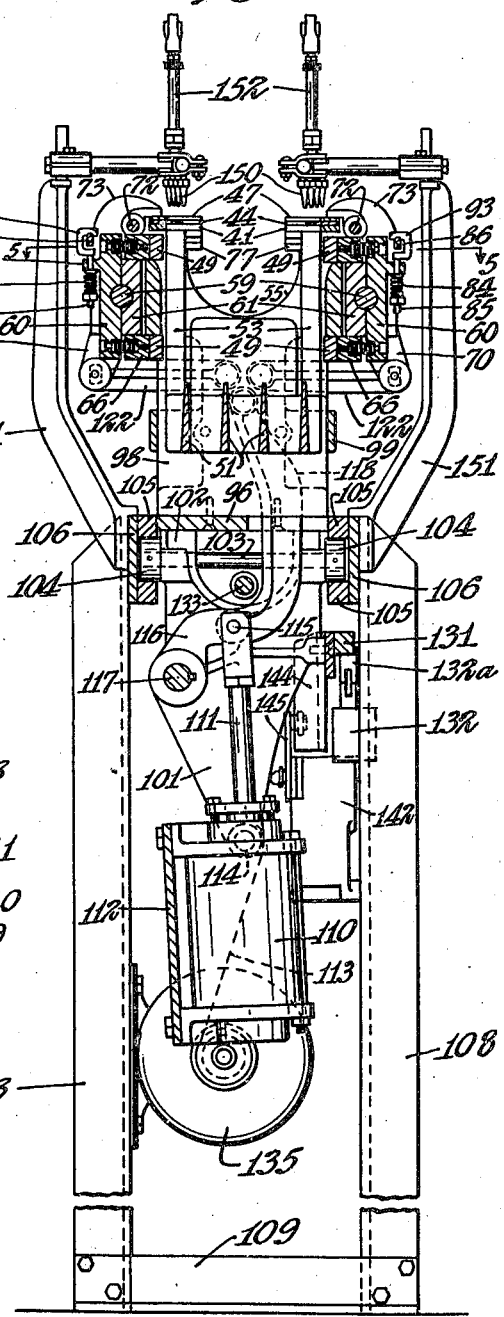
Fig. 3 is a section taken on the line 3—3 of Fig. 1.

To support the receptacles for battery cell elements and clamp mechanism hereinbefore described, a carriage is provided having a horizontal base plate 96 upon which upstanding frame members 97 and 98 are rigidly fastened, as best shown in Figs. 1, 3 and 6. The members 97 and 98 are fastened together in pairs by cross members 56 and 99. Within each of the frames thus formed, one of the receptacles for battery elements is removably mounted. Each receptacle fits between frame members 97 and 98 and is supported on pairs of fixed studs 100 projecting into slots extending upward from the bottom of the receptacle as shown in Fig. 6. Hangers 101 are rigidly fastened to the base plate 96 to extend downward and bearings 102 for wheel shafts 103 are formed in the hangers. Another pair of bearings 102a is fastened to the plate 96 in spaced relation to the others. Mounted on the ends respectively of each of the shafts 103 are rollers 104 for supporting the carriage on rails 105 which are, in turn, supported on the inner faces of longitudinally extending frame members 106. End plates 107 connect the frame members 106 together in spaced parallel relation to each other at the respective ends of the machine. The frame thus constructed is supported on legs 108 connected in pairs near their lower ends by brace members 109.

Clamp power transmission and controls

The hangers 101 project below the carriage to support an air cylinder 110 having a piston adapted to operate a piston rod 111 which is connected to the several clamping members on the carriage. As illustrated, the cylinder 110 is rigidly mounted on a yoke 112 and the latter is formed with parallel flanges 113 which are suspended from the hangers 101 on pivot pins 114. At its upper end the piston rod 111 is connected by a pin 115 to one end of a guide arm 116, and the other end of this arm is fastened to a rock shaft 117 having bearings on the hangers 101. The pin 115 also connects the upper end of the piston rod 111 to the lower end of a rigid link 118, shown in detail in Fig. 22. The upper end of this link is joined by a pivot bolt 119 to a slide block 120 mounted in a vertically extending guide recess 121 formed in the carriage frame member 98. Also connected to this slide block 120 are the inner ends of toggle links 122 having their outer ends pivotally joined to the lower ends respectively of the arms 70 associated with one of the receptacles for battery elements. The toggle links 122, block 120, link 118 and guide arm 116 are duplicated for each of the receptacles for battery elements on the carriage so that the several clamping mechanisms are operated in unison to and from closed position.

Flexible conduits 123 and 124 communicate with the lower and upper ends respectively of the air cylinder 110 to supply air under pressure thereto. These conduits extend to a valve 125 which is mounted on one of the legs 108 and have sufficient length to allow the necessary movement of the carriage along the machine frame. Air under pressure is supplied to the valve 125 through a conduit 126 (Fig. 4). A valve operating shaft 127 extends across the machine frame to the station of an operator at the front thereof and this shaft is fitted with a manually operable handle 128 for actuating the valve. When the handle 128 is in one position the valve admits air to the bottom of the cylinder 110 through conduit 123 while permitting the escape of air from the upper end of the cylinder through the conduit 124 to thereby close the clamping mechanism and with the valve in another position the operation is reversed to open the several clamps relative to the work.

Figure 2:
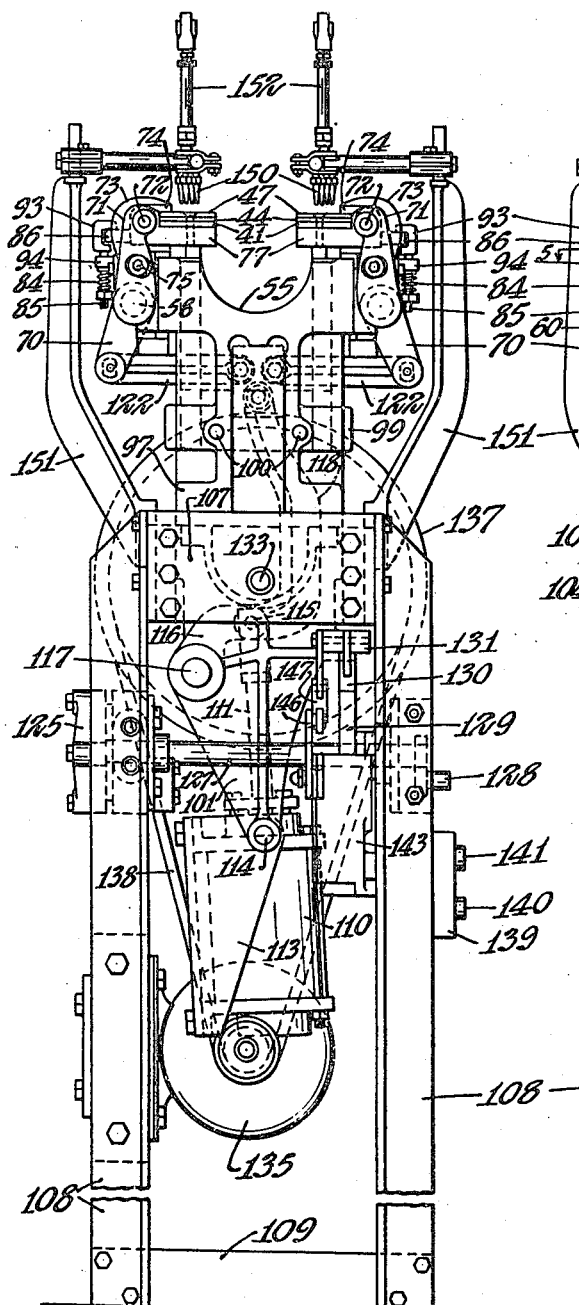
Fig. 2 is a left end elevation of the same.

Spaced inward along the valve shaft 127 from the handle 128 is a crank arm 129 projecting into the path of a trip 130 mounted on the movable carriage for automatically returning the valve to clamp opening position at the end of a cycle of operation. As best shown in Figs. 1 and 2, the trip finger 130 projects down from a cam bar 131. This bar is fastened to the hangers 101, as shown in Fig. 3, and extends horizontally beneath one side of the carriage to operate an oxygen control valve 132, as hereinafter described. The trip 130 is pivotally supported to permit free swinging movement of its lower end from the normal pendant position shown in Fig. 1 toward the left but it cannot swing in the reverse direction, to the right from the illustrated position.

Carriage drive mechanism

To move the carriage longitudinally of the supporting rails 105, a power-driven screw shaft 133 is provided. This shaft extends in parallel relation to the rails 105 and is threaded to engage a nut 134 which depends from the base plate 96 of the carriage and is rigidly fastened thereto (Figs. 1, 4 and 6). Combined journal and thrust bearings are provided for the shaft 133 on the frame end plates 107 and one end of this shaft projects above an electric motor 135 for driving it. As shown, the driving connections comprise a pulley 136 fixed on the motor shaft, a driven pulley 137 fixed on the shaft 133 and a belt 138. To facilitate change speed adjustments provision is made for changing the pitch diameter of the pulley 137 which is of the common V type for use with a V-type belt 138. The motor 135 is of the reversible type and is under control of switches comprising a manually operable start and stop switch 139 having a starter button 140 and an emergency stop button 141, a limit and reversing switch 142 mounted near the right end of the machine as seen in Fig. 1 and a second limit switch 143 mounted near the left end of the machine.

As shown in Figs. 1 and 3, the right end of the carriage has an angle bar 144 projecting down therefrom to actuate a switch arm 145 which projects up from the switch 142 into the path of this angle bar. Operation of the switch arm 145 by the bar 144 causes the motor to be stopped and then started in reverse. Projecting up from the other limit switch 143 is a switch-actuating arm 146 which is spring biased to normally retain it in the path of a trip 147 depending from a bracket mounted on the bar 131. The switch 143 is opened to stop the motor 135 when the arm 146 is actuated by the trip 147 thereby stopping movement of the carriage as it approaches the left end of the supporting rails. Suitable circuits including the motor 135, control switches hereinbefore described and a reversing line starter 148 are shown in Fig. 18, wherein a three-phase power supply line is indicated at 149.

Heating apparatus

As shown in Figs. 1 to 4 inclusive, two series of flame directing jets 150 are mounted above the main frame of the machine on brackets 151 and these brackets are bolted to the longitudinal frame members 106 at opposite sides. The jets 150 are arranged to direct high temperature flames precisely against the upper surfaces of the strap castings and lugs of the cell groups as the latter are conveyed below on the carriage. A mixture of oxygen and combustible gas is conducted to the several jets 150 through branch pipes 152 and a main pipe 153 extending to the oxygen valve 132, the latter being supplied with the oxygen through a pipe 154, as indicated in Fig. 1.

Automatic burning operation

In the operation of my machine, the carriage supporting the several receptacles for battery cell elements is normally stationed at the extreme left end of the supporting frame with the trip 147 to the left of the electric switch arm 146, as seen in the front view, Fig. 1. When the carriage is in this stationary position the valve 125 is initially in position to retain the several clamping elements in open position like that shown in Fig. 11. The operator now places the loosely assembled electrode and separator elements for a complete cell in each of the three receptacles, as hereinbefore described. In each receptacle there is then a row of plate lugs of one polarity projecting upward near the front side of the machine and a row of lugs of the opposite polarity extending in a row along the back side of the machine. To properly adjust the several elements in the receptacles and hold them in adjusted positions during the burning operation, the operator manipulates the valve handle 28 to admit air under pressure to the hose 123 connected to the lower end of the cylinder 110 and to allow air to escape from its upper end. This actuates the piston and rod 111 upward, rocking the shaft 117 in its bearings in the hangers 110 and moving the three links 118 upward together with the slide blocks 120 and inner ends of the several pairs of toggle members 122, forcing the lower ends of the arms 70 outward and oscillating the crank shafts 58 to close the clamping mechanism on the groups of battery elements, as hereinbefore described in detail.

At this time the operator places a pair of the post and strap castings in burning position relative to the upper ends of the plate lugs in each group receptacle, with the flanges 32 of the straps in engagement with the upper edges of the separators 38 and also in engagement with the plate lugs, as indicated in Fig. 25. The motor 135 is then started by closing the switch 148 using the starter button 140. Through its connections with the horizontal screw shaft 133, the motor rotates this shaft in the appropriate direction to move the carriage along the rails 105 to the right as seen in Fig. 1 and at a predetermined rate of travel. Assuming that combustible gas is being supplied to the jets 150 and has been ignited so that the burners are in operation, this movement of the carriage continues while the several groups of battery lug and strap assemblies are passed through the heating zone created by the flame from the jets 150. The intensity of the heating jets is increased just before the work enters the heating zone by engagement of the cam bar 131 with the operating lever 132a of the oxygen valve 132.

Movement of the carriage to the right continues until the work has passed beyond the heating zone. At this time in the cycle of operation the angle bar 144 on the carriage engages the lever 145 of the limit switch 142 to stop the operation of the motor 135 in the forward direction and to immediately reverse its direction of operation. This causes the screw 133 to rotate in the reverse direction and through the nut 134 the carriage is moved to the left from the right end of the machine, thereby conveying the work to and through the heating zone a second time. It will be evident that a brief interval for cooling of the work is allowed during the dwell of the carriage at the right end of the machine. This guards against overheating and excessive melting which would result in loss of metal from the mold recesses. During the second pass of the work through the heating zone the burning operation is completed and the carriage continues in its travel to the left until the trip 147 again actuates the switch arm 146 to stop the motor and carriage.

Shortly before the carriage reaches its left end position the trip 130 strikes the valve arm 129 to reverse the position of the valve 125 controlling the pneumatic clamp-operating mechanism. For this opening movement of the clamp jaws the piston rod 111 is moved downward together with the several members connecting it to the inner ends of the toggle arms 122. By the time the carriage comes to rest the work has cooled sufficiently so that the groups of battery elements may be removed from the receptacles mounted on the carriage. To remove the groups, the operator grasps the outer faces of the electrode plates where they are exposed in the arcuate openings 55 formed in the receptacles. Since these cell groups are complete with straps and posts rigidly united to the electrode lugs, the several groups may be placed immediately in the cells of battery containers.

By making it unnecessary to adjust the relative positions of the plates and separators or to assemble the groups after the burning operation, I avoid danger of breaking the connections between the lugs and straps. My improved straps are rendered unusually strong by reason of their angular shape in cross section and this makes it feasible to reduce the amount of lead that would otherwise be required to impart adequate strength. The resulting saving of lead in the strap construction materially reduces the cost of the batteries.

Embodiments of my invention have been constructed and are in successful operation. The cycle of operation of these machines is completed in a period of from $\frac{1}{10}$ to $\frac{1}{6}$ of a minute when the carriages are operated at a rate of from 5 to 6 feet a minute and with a stroke of approximately 30 inches in length to and from starting position. A single operator is able to unload and load one machine during the burning cycle of another machine. Thus a single workman operating two of my improved machines is able to produce approximately six complete battery cell groups per minute. It has been found that my improved machine not only substantially reduces the time required to assemble and unite the battery elements in cell groups but that it also insures the formation of uniform, durable connections between the several straps and rows of electrode lugs.

Having described my invention, what I claim as new and desire to protect by Letters Patent is:

1. In apparatus of the class described, a receptacle for the electrodes and separators of a complete battery cell in a group wherein the electrode lugs of opposite polarity project upward from the upper edges of the separators in rows and means for positioning the separators and lugs in said group comprising, a substantially horizontally extending upper series of teeth associated with the lugs of each row and spaced to intermesh with the lugs, a lower series of narrower teeth associated with each row of lugs and severally formed to extend between the separators beneath a tooth of the upper series and means for actuating said teeth with horizontal and downward components of movement to engage the separators between plate lugs in said receptacle.

2. In apparatus of the class described, a receptacle for the electrodes and separators of a complete battery cell in a group wherein the electrode lugs of opposite polarity project upward from the upper edges of the separators in horizontally spaced rows and means for positioning the separators and lugs in said group comprising, for each row of said lugs a substantially horizontally extending upper series of teeth spaced to intermesh with the lugs of the row and to support a strap for connecting the lugs together, a lower series of relatively long, narrow and tapered teeth each formed to extend between the separators beneath a tooth of the upper row and means for actuating said teeth with horizontal and downward components of movement to engage the separators between plate lugs in said receptacle.

3. In apparatus of the class described, a receptacle for the electrodes and separators of a complete battery cell loosely assembled in a group wherein the electrode lugs of opposite polarity project upward from the upper edges of the separators in horizontally spaced rows, clamp jaw members movable from opposite ends of said group to and from the respective rows of lugs, a substantially horizontally extending upper series of teeth associated with each of said clamp jaw members and spaced to intermesh with the lugs of one of said rows above the upper edges of the separators, a lower series of teeth associated with each of said clamp jaw members, each of said lower teeth being formed to fit between the separators beneath a tooth of the upper row and means for actuating said clamp jaw members with horizontal and downward components of closing movement to cause the several teeth to engage and position the separators and plate lugs of the group in said receptacle.

4. In apparatus of the class described, a receptacle for the electrodes and separators of a complete battery cell loosely assembled in a group wherein the electrode lugs of opposite polarity project upward from the upper edges of the separators in horizontally spaced rows, clamp jaw members movable from opposite ends of said group to and from the respective rows of lugs, a substantially horizontally extending series of teeth associated with each of said clamp jaw members and spaced to intermesh with the lugs of a row and at an elevation above the upper edges of the separators, the length of each tooth being equal to the width of the adjacent lug portions and means for actuating said clamp jaw members with horizontal and downward components of closing movement to cause said teeth to engage and press down on the separators between the several plate lugs of a group in said receptacle.

5. In apparatus of the class described, a receptacle for the electrodes and separators of a complete battery cell in a loosely assembled group wherein the electrode lugs of opposite polarity project upward from the upper edges of the separators in horizontally spaced rows, clamp jaw members movable from opposite ends of said group to and from the respective rows of lugs, a substantially horizontally extending upper series of teeth associated with each of said clamp jaw members and spaced to intermesh with the lugs of a row and at an elevation above the upper edges of the separators, each of said teeth being equal in length to the width of the adjacent lug portions, a lower series of teeth associated with each of said clamp jaw members, each of said lower teeth being formed to extend between the separators beneath a tooth of the upper series and having a tapered inner end projecting inward from the inner end of the tooth above and means for actuating said clamp jaw members with horizontal and downward components of closing movement to cause the several teeth to engage and position the separators and plate lugs of the group in said receptacle.

6. In apparatus of the class described, a receptacle adapted to receive a group of battery plates and separators, said plates having lugs projecting upward therefrom in a row to be connected together by a strap, the improvements which comprise, an upper comb having teeth spaced to receive the several plate lugs between them, a lower comb having relatively narrow teeth severally projecting in parallel relation to the teeth of the upper comb beneath the same to space separators in said groups, a mold member having a recess formed to enclose three sides of said strap above said combs and means for actuating said combs and mold member to and from strap receiving position relative to said row of plate lugs.

7. In apparatus having a receptacle adapted to receive a loosely assembled group of battery plates and separators, said plates having lugs projecting upward therefrom in a row to be connected together by a strap formed with fingers projecting substantially horizontally between adjacent lugs in the row and said strap having a flange projecting down from the fingers for contact with the upper edges of said separators, the improvements which comprise, a comb having substantially horizontally extending teeth spaced to receive the several plate lugs between them at an elevation above the upper edges of the separators, end surfaces being formed on said teeth for contact with said strap flange beneath the strap, a mold member having a recess formed to enclose three sides of said strap above the comb, means for actuating said comb and mold member substantially longitudinally of the upper edges of the separators, to and from strap receiving position above the separators, clamping members movable to and from opposite edge surfaces of the plates and separators in said receptacle to position and hold the several elements of a group during the burning of said strap to the plate lugs and means for operating said clamping members in unison with the movement of said comb and mold member to and from strap receiving position.

8. In apparatus of the class described, substantially horizontally extending comb-like plates superimposed one on the other, the lower of said plates being formed with a series of spaced teeth, the side faces of which are tapered toward the free ends thereof, the upper of said plates being formed with relatively short wide teeth severally projecting at an elevation above the teeth of the lower plate, said teeth of the upper plate being severally formed to fit between battery plate lugs of an assembled group of cell elements and said teeth of the lower plate being severally formed to fit between plate separators in said cell group.

9. In apparatus of the class described, substantially horizontally extending comb-like plates superimposed one on the other, the lower of said plates being formed with a series of horizontally spaced teeth, the side faces of each tooth being tapered toward the free end thereof, the upper of said plates being formed with relatively short and wide teeth severally projecting at an elevation above the teeth of the lower plate, said teeth of the upper plate being severally formed to fit between battery plate lugs of an assembled group of cell elements and the teeth of the lower plate being severally formed to fit between plate separators in said cell group and power actuated means for moving said plates in unison and substantially horizontally to and from operative position relative to said assembly of battery cell elements.

10. In a machine of the class described, a receptacle for the electrodes and separators of a complete battery cell loosely assembled in a group, the electrodes being narrower than the separators and means for holding the elements of said group in predetermined relation to each other comprising clamp jaw plates mounted to face opposite vertical edges of the battery elements in said receptacle, the contact faces of said plates having a multiplicity of horizontally spaced members formed to intermesh with the separators and to engage the vertical edge surfaces of the electrodes, a substantially horizontally movable support for each of said jaw plates, power-actuated means for moving said plate supports in unison to and from contact with the battery elements in said receptacle and pressure relief springs interposed between said plates and their supports respectively.

11. In a machine of the class described, a receptacle for the electrodes and separators of a complete battery cell loosely assembled in a group and means for holding the elements of said group in predetermined relation to each other comprising clamp jaw plates mounted to face opposite vertical edges of the battery elements in said receptacle, a substantially horizontal movable support for each of said plates, pressure relief springs interposed between said plates and supports and means for moving said plate supports to and from the battery elements in said receptacle comprising, crank shafts extending across the ends respectively of said receptacle, means operatively connecting said plate supports to the cranks of said shafts, rocker arms fixed on and depending from said shafts respectively and power actuated means connected to the lower ends of said arms for imparting oscillating movement thereto.

12. In apparatus of the class described, a receptacle for the elements of a complete battery cell loosely assembled in a group wherein the electrode lugs project upward in horizontally spaced rows, oppositely disposed jaw members projecting inward from opposite ends of said group, each of said jaw members having a series of teeth spaced to intermesh with the lugs of one of said rows and to extend beneath a strap for connecting the lugs of the row together, hinge supports for said jaw members near their outer extremities permitting limited oscillating movement of their inner extremities in a vertical arc to and from the top of the battery elements in said receptacle, spring actuated means for normally raising the inner extremities of said jaw members as they are withdrawn from beneath the lug straps and means for actuating said hinge supports and jaw members with downward and inward components of movement during the closing stroke thereof.

13. In apparatus of the class described, a receptacle for the elements of a complete battery cell loosely assembled in a group wherein the electrode lugs project upward in horizontally spaced rows, oppositely disposed jaw members projecting inward from opposite ends of said group, each of said jaw members having a series of teeth spaced to intermesh with the lugs of one of said rows and to extend beneath a strap for connecting the lugs of the row together, arms depending from said jaw members respectively and pivotally connected to their outer extremities whereby said jaw members are supported for limited oscillating movement of their inner extremities in a vertical arc to and from the top of the battery elements in said receptacle, spring actuated means for normally raising the inner extremities of said jaw members as they are withdrawn from beneath the lug straps, clamp jaw plates mounted to face opposite vertical edges of the battery elements in said receptacle, a substantially horizontally movable support for each of said plates, pressure relief springs interposed between said plates and supports, crank shafts extending across the ends respectively of said receptacle, said arms being connected to said crank shafts for oscillating movement therewith, means operatively connecting said plate supports to the cranks of said shafts, rocker arms fixed on and depending from said shafts respectively and power actuated means connected to the lower ends of said rocker arms for imparting oscillating movement thereto in unison and for actuating said jaw members and plates to and from holding position relative to the battery cell elements in said receptacle.

14. In a machine of the class described, a carriage, means on said carriage for holding a plurality of groups of battery elements each comprising the elements of a complete cell in assembled relation, a track supporting said carriage for movement along a predetermined path, flame directing jets, means supporting said jets at a fixed elevation above and adjacent to said path to form a melting zone at a fixed elevation corresponding to the elevation of the several groups of plate lugs and straps on said carriage and power driven means for imparting a reciprocating cycle of movement to said carriage along said rails to convey the lug and strap elements of said cell groups from an initial position at one side of said heating zone, through said zone, beyond it and to return them through said zone at a predetermined rate whereby the work is automatically heated in said zone in two stages and for the period required to unite the lugs with the straps.

15. In apparatus of the class described, means for holding a group of battery plates and separators in assembled relation to each other, said plates having lugs projecting upward therefrom in a row to be connected together by a strap, the improvements which comprise, an upper series of teeth spaced to receive the several plate lugs between them, a lower series of relatively narrow teeth projecting in parallel relation to the teeth of the upper series beneath the same to space separators in said group and means for actuating both series of teeth to and from an operative position in intermeshed relation to said row of plate lugs and the separators of said group.

16. In a machine of the class described, a receptacle for battery elements including electrodes and separators loosely assembled in upright positions in a group, relatively movable gripping members mounted to engage opposite vertical edges respectively of battery elements in said receptacle and at an elevation intermediate the top and bottom thereof, means for actuating said members to and from gripping position relative to said elements and pressure relief means interposed between said actuating means and at least one of said gripping members to limit the pressure applied edgewise of the separators to the battery elements in said receptacle.

17. In a machine of the class described, a receptacle for electrodes and separators loosely assembled in upright positions in a group, the electrodes being narrower than the separators, relatively movable jaw plates mounted to engage opposite vertical edges respectively of the separators in said receptacle and at an elevation intermediate the top and bottom thereof, a multiplicity of horizontally spaced projections on the contact faces of said plates formed to intermesh with the separators and to engage the several vertical edge surfaces of the electrodes to space them inward from the respective edges of the separators and means for actuating at least one of said jaw plates to and from clamping position relative to the vertical edges of the battery elements.

18. In a machine of the class described, a receptacle for electrodes and separators loosely assembled in upright positions in a group, the electrodes being narrower than the separators, jaw plates mounted to engage opposite vertical edges respectively of the separators in said receptacle and at an elevation intermediate the top and bottom thereof, a multiplicity of horizontally spaced projections on the contact faces of said plates formed to intermesh with the separators and to engage the several vertical edge surfaces of the electrodes to space them inward from the respective edges of the separators, means supporting said jaw plates for relative movement to and from the vertical edges of the battery elements, power-driven actuating means for at least one of said plates and pressure relief means interposed between said actuating means and jaw plate.

19. In a machine of the class described, a carriage, means on said carriage for holding in fixed relation to each other a group of plates and a strap for connecting said plates together, a track supporting said carriage for movement along a predetermined path, flame directing jets mounted above and adjacent to said path to form a melting zone at a fixed elevation corresponding to the elevation of the plate lugs and strap on said carriage and power-driven means for imparting a reciprocating cycle of movement to said carriage along said rails to convey said plate and strap elements from an initial position at one side of said heating zone, through said zone, beyond it and to return them through said zone at a predetermined rate whereby the work is automatically heated in said zone in two stages and for the period required to unite the plates to said strap.

WILLIAM C. SARGENT.

REFERENCES CITED

The following references are of record in the file of this patent:

UNITED STATES PATENTS

| Number | Name | Date |
|---|---|---|
| 1,358,869 | Norris | Nov. 16, 1920 |
| 1,932,136 | Hole | Oct. 24, 1933 |
| 1,960,195 | Nyce | May 22, 1934 |
| 871,393 | Flanders | Nov. 19, 1907 |
| 1,339,061 | Hawkins | May 4, 1920 |
| 1,389,155 | Norris | Aug. 30, 1921 |
| 1,396,162 | Campbell et al. | Nov. 8, 1921 |
| 1,410,716 | Peers | Mar. 28, 1922 |
| 1,531,753 | Norris | Mar. 31, 1925 |
| 1,841,194 | Lormor | Jan. 12, 1932 |
| 1,990,445 | Younkman | Feb. 5, 1935 |
| 2,265,413 | Young | Dec. 9, 1941 |
| 2,287,802 | Hill | June 30, 1942 |